(12) United States Patent
Rollin et al.

(10) Patent No.: US 10,131,434 B2
(45) Date of Patent: Nov. 20, 2018

(54) COOLING ASSEMBLY FOR AN AIRCRAFT PROVIDED WITH A FAN

(71) Applicant: TECHNOFAN, Blagnac (FR)

(72) Inventors: Pascal Rollin, Daux (FR); Samuel Bonnard, La Salvetat Saint Gilles (FR); Wenceslas Bourse, Beauzelle (FR); Jacques Vincent, Toulouse (FR)

(73) Assignee: TECHNOFAN, Blagnac (FR)

( * ) Notice: Subject to any disclaimer, the term of this patent is extended or adjusted under 35 U.S.C. 154(b) by 308 days.

(21) Appl. No.: 15/059,836

(22) Filed: Mar. 3, 2016

(65) Prior Publication Data

US 2016/0257412 A1 Sep. 8, 2016

(30) Foreign Application Priority Data

Mar. 4, 2015 (FR) ...................... 15 51809

(51) Int. Cl.
| | |
|---|---|
| F04D 25/06 | (2006.01) |
| B64D 13/08 | (2006.01) |
| F04D 19/00 | (2006.01) |
| F04D 25/08 | (2006.01) |
| H02P 27/04 | (2016.01) |
| H01F 27/02 | (2006.01) |
| H02M 7/00 | (2006.01) |
| B64D 13/06 | (2006.01) |

(Continued)

(52) U.S. Cl.
CPC ........... *B64D 13/08* (2013.01); *F04D 19/002* (2013.01); *F04D 25/068* (2013.01); *F04D 25/08* (2013.01); *H01F 27/025* (2013.01); *H02M 7/003* (2013.01); *H02P 27/04* (2013.01); *B64D 2013/0603* (2013.01); *H01F 30/02* (2013.01); *H02M 5/12* (2013.01); *H02M 5/14* (2013.01); *H02M 5/458* (2013.01); *H02M 7/08* (2013.01)

(58) Field of Classification Search
CPC .... F04D 29/403; F04D 29/601; F04D 25/068; F04D 25/08; F04D 19/002; B64D 13/08; B64D 2013/0603; H01F 27/025; H01F 30/02; H02M 7/003; H02M 7/08; H02M 5/14; H02M 5/12; H02M 5/458
USPC ........................................ 417/353, 355, 366
See application file for complete search history.

(56) References Cited

U.S. PATENT DOCUMENTS

| | | | | |
|---|---|---|---|---|
| 4,493,016 A | * | 1/1985 | Cham ...................... | H02M 7/08 336/215 |
| 4,808,896 A | * | 2/1989 | Katsuragi ............... | B63C 11/52 318/436 |

(Continued)

FOREIGN PATENT DOCUMENTS

| | | | |
|---|---|---|---|
| CN | 203009328 | * | 6/2013 |
| EP | 2 357 133 A1 | | 8/2011 |
| WO | 2008/153257 A1 | | 12/2008 |

OTHER PUBLICATIONS

French Search Report, dated Jan. 18, 2016, from corresponding French Application.

*Primary Examiner* — Charles Freay
(74) *Attorney, Agent, or Firm* — Young & Thompson

(57) ABSTRACT

A cooling assembly (15) includes a conduit (16) including a side wall (17) and a fan (20) that includes a rotating electric machine (32), a power supply module (35) including three distinct single-phase self-transformers (79a, 79b, 79c), each single-phase self-transformer being magnetically decoupled from one another, each single-phase self-transformer (79a, 79b, 79c) surrounding the side wall (17) of the conduit.

9 Claims, 5 Drawing Sheets

(51) Int. Cl.
*H01F 30/02* (2006.01)
*H02M 5/12* (2006.01)
*H02M 5/14* (2006.01)
*H02M 5/458* (2006.01)
*H02M 7/08* (2006.01)

(56) References Cited

U.S. PATENT DOCUMENTS

| | | | |
|---|---|---|---|
| 5,527,159 A * | 6/1996 | Bozeman, Jr. | A61M 1/10 415/900 |
| 8,737,097 B1 * | 5/2014 | Swamy | H02M 5/458 363/67 |
| 2007/0103125 A1 | 5/2007 | Singh et al. | |
| 2011/0203497 A1 * | 8/2011 | Weimer | F23L 5/02 110/104 R |
| 2011/0204628 A1 | 8/2011 | Darnis | |
| 2012/0234520 A1 * | 9/2012 | Pal | H05K 7/20909 165/121 |
| 2012/0236498 A1 | 9/2012 | Pal et al. | |
| 2013/0294930 A1 | 11/2013 | Pal | |
| 2015/0000232 A1 * | 1/2015 | Hammers | B01D 49/00 55/385.1 |
| 2015/0270057 A1 * | 9/2015 | Lestician | H01F 27/2823 323/361 |

* cited by examiner

COOLING ASSEMBLY FOR AN AIRCRAFT PROVIDED WITH A FAN

This patent application claims the benefit of french patent application FR 15 51859 filed on Mar. 4, 2015 which is hereby incorporated by reference.

FIELD OF THE INVENTION

The present invention relates to a cooling assembly. The present invention relates to an aircraft each including such an assembly.

BACKGROUND OF THE INVENTION

The use of fans loaded on board diverse types of aircraft, and notably on board airplanes is known.

Generally, the fans loaded on board are used for cooling various loaded pieces of equipment such as for example on-board computers or other devices fitting out the aircraft. Other loaded on-board fans contribute, as an illustration, to the recirculation of air in the cabin of the aircraft.

For this, the aforementioned on-board fans include a rotary electric machine powered by an electric power supply network which is part of the aircraft. The fans also comprise a ventilation wheel secured to the rotor of the rotary machine. The fan wheel is for example formed with a propeller and is positioned in an air conduit opening onto the outside of the aircraft.

The use of on-board fans with an alternating current power supply with variable frequencies is also known.

Such fans are generally connected to the electric power supply network providing a three-phase current by means of a three-phase rectifier self-transformer. A rectifier self-transformer gives the possibility of transforming the three-phase electric network into a DC current network guaranteeing standardized harmonic rejection on the network.

A self-transformer is a transformer for which at least two windings have a common portion. The three-phase self-transformer usually includes a same magnetic circuit in a ferromagnetic material for the three windings corresponding to the three phases. Such a magnetic circuit corresponds to a frame forming two "Es" facing each other. The three windings are each wound on one leg of these "Es".

However, the fans including standard three-phase self-transformers are relatively bulky. Further, the manufacturing of these self-transformers is relatively complicated, expensive and the performances are difficult to reproduce from one making to the other.

Therefore there exists a need for a compact cooling assembly including a fan provided with a device for transforming a three-phase electric current, the whole being more easily manufactured.

SUMMARY OF THE INVENTION

For this, a cooling assembly is proposed, including a conduit including a side wall, an air intake and an air outlet allowing circulation of an air flow in the conduit, and a fan.

The fan comprises a rotating electric machine comprising a rotary shaft and a fan wheel secured to the shaft, a supply module able to connect the rotating electric machine to an electric power supply network providing a three-phase electric network, the supply module including a transformation device able to adapt the three-phase electric current provided by the network to the power supply of the machine and including three input terminals connected to the network, at least three output terminals connected to the machine, three distinct single-phase self-transformers and magnetically decoupled, each single-phase self-transformer being connected to one of the input terminals and at least to one of the output terminals and being able to modify the voltage values of an input single-phase alternating current from the corresponding input terminal in order to obtain a modified output current on said or each output terminal corresponding to the single-phase self-transformer, each self-transformer surrounding the side wall of the conduit.

According to particular embodiments, the cooling assembly comprises one or several of the following features, taken individually or according to all the technically possible combinations:

- each single-phase self-transformer has an inner diameter and the side wall of the conduit has an outer diameter, the inner diameter of each single-phase self-transformer being greater than or equal to the outer diameter of the side wall.
- the inner diameter of each single-phase self-transformer is greater than or equal to 70 mm.
- the inner diameter of each single-phase self-transformer is identical.
- each single-phase self-transformer includes an inner surface, the inner surface being in contact with the side wall of the conduit.
- the totality of the inner surface of each single-phase self-transformer is in contact with the side wall of the conduit.
- each single-phase self-transformer includes a ferromagnetic core with a torus shape and a primary winding wound around at least one portion of the core and connected to the input terminal corresponding to the relevant single-phase self-transformer.
- each single-phase self-transformer is at the same distance from the closest single-phase self-transformer.
- the conduit further includes a heat exchanger.
- the three single-phase self-transformers are substantially identical.
- the fan comprises first connecting means allowing the primary windings to be connected as a triangle.
- the fan includes at least six output terminals and is able to convert the three-phase alternating current provided by the electric power supply network into six output single-phase alternating currents, each output single-phase alternating current powering one of the output terminals.
- each single-phase self-transformer further comprises two secondary windings wound around at least one portion of the core, each secondary winding being connected to one of the output terminals corresponding to this single-phase self-transformer.
- the fan further comprises second connecting means allowing the secondary windings corresponding to a same single-phase self-transformer and the primary windings corresponding to the two other single-phase self-transformers to be connected together.
- the rotary electric machine is a three-phase machine.
- the power supply module further includes a rectifier able to convert the three-phase alternating current provided by the transformation device into a direct current, and a converter able to convert the direct current provided by le rectifier to a three-phase current adapted for powering the rotating electric machine, the rectifier being connected between the transformation device and the converter, the converter being connected between the rectifier and the rotary electric machine.

the single-phase self-transformers are spaced apart around the outer wall of the rotating electric machine, in a uniform way.

Moreover, an aircraft is also proposed, including an assembly as described earlier.

BRIEF DESCRIPTION OF THE DRAWINGS

Other features and advantages of the invention will become apparent upon reading the description which follows of an embodiment of the invention, only given as an example and with reference to the drawings wherein.

DETAILED DESCRIPTION OF THE PREFERRED EMBODIMENTS

Figure 1:
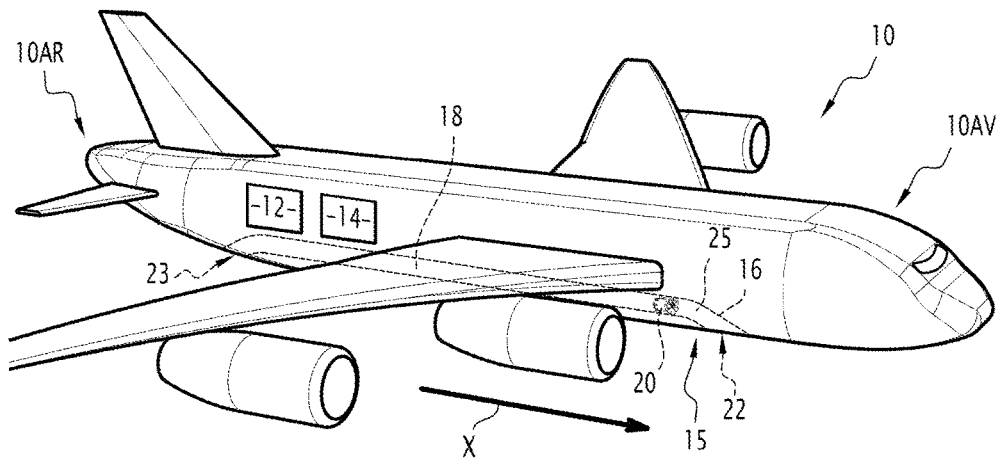
FIG. 1, is a schematic view of an aircraft comprising a cooling assembly.

An aircraft 10 is illustrated in FIG. 1.

The aircraft 10 is for example an airliner.

The aircraft 10 is able to move along a longitudinal axis X corresponding to the movement of the aircraft 10.

For the aircraft 10, a front portion 10AV and a rear portion 10AR are defined.

The aircraft 10 includes a network 12, a piece of equipment 14 and a cooling assembly 15.

The network 12 is an electric power supply network.

The network 12 is a high voltage electric network able to provide a three-phase alternating current. According to the example of FIG. 1, the network 12 is able to issue an alternating voltage between each phase and a neutral. As an illustration, the voltage is either equal to 115 Volts or equal to 230 Volts.

Further, the intensity provided by the network 12 is for example equal to 30 Amperes.

The alternating currents provide for each phase of the network 12 are spaced apart by an electric phase of 120°.

The network 12 comprises at least three terminals for connecting to each phase.

The piece of equipment 14 is a piece of on-board equipment.

The on-board piece of equipment 14 comprises, according to the illustrated example, any unit of the aircraft 10 for which cooling is indispensable during at least certain phases for operating the aircraft 10.

An example of such a unit is an on-board computer or a portion of such a computer, for example a computing core.

The cooling assembly 15 is able to ensure cooling of the piece of equipment 14.

The cooling assembly 15 includes an air conduit 16 and a fan 20.

The conduit 16 includes a side wall 17, a middle segment 18, an air intake 22, an air outlet 23 and a heat exchanger 24.

The conduit 16 includes a side wall 17 delimiting an inner portion 25. In the inner portion 25, the conduit 16 is adapted for allowing circulation of air.

The middle segment 18 connects the air intake 22 to the air outlet 23.

The middle segment 18 has a cylindrical shape.

Further, the middle segment 18 extends along the longitudinal direction X.

The air intake 22 is positioned in the front portion 10AV of the aircraft 10.

The air outlet 23 is positioned in the rear portion 10AR of the aircraft 10.

The air intake 22 and the air outlet 23 are adapted for allowing circulation of an air flow in the inner portion 28 of the conduit 16.

The heat exchanger 24 is found in a middle segment 18.

The heat exchanger 24 is positioned transversely in the middle segment 18.

Figure 2:
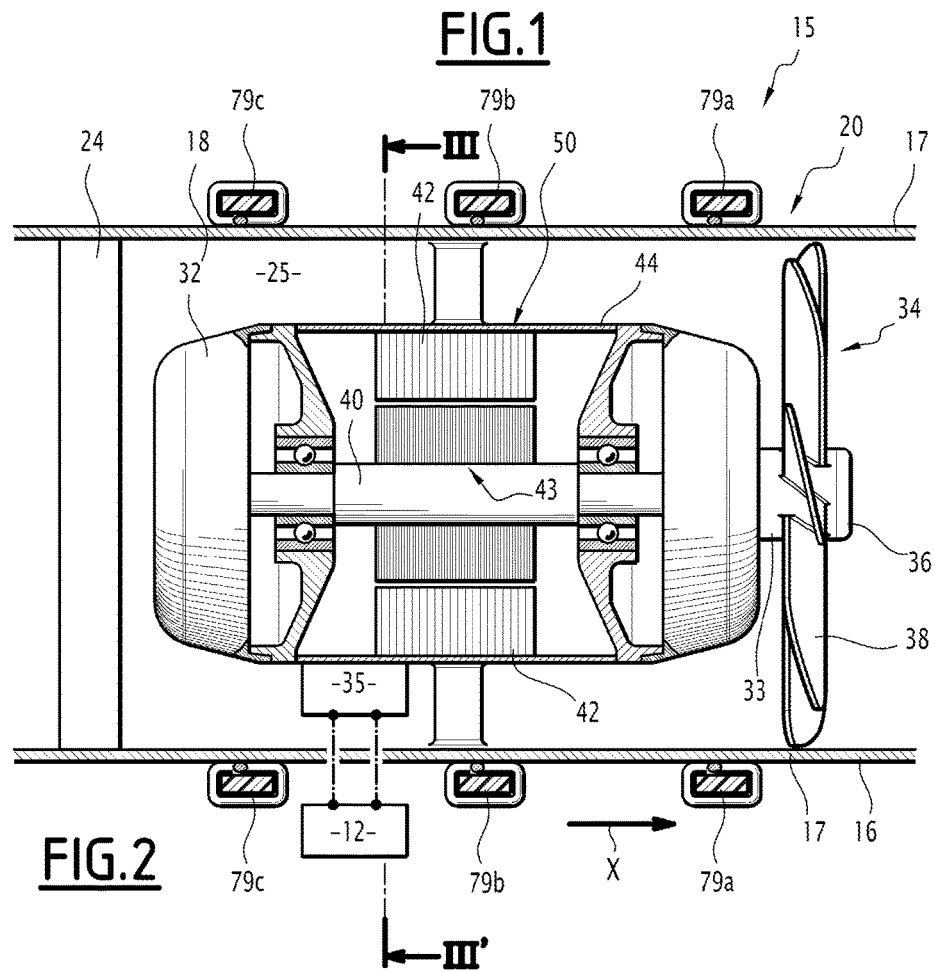
FIG. 2, is a partly sectional schematic view of the cooling assembly of FIG. 1, the cooling assembly comprising a fan including a power supply module.

The heat exchanger 24, which is notably schematically illustrated in FIG. 2, gives the possibility of putting the cold air in contact with the piece of equipment 14. Thus, the heat exchanger 24 gives the possibility of cooling the piece of equipment 14 when the piece of equipment 14 is exposed to an air flow circulating in the conduit 16.

The fan 20 is positioned in the conduit 16 and is able to generate an air flow in the conduit 16.

The fan 20 is illustrated in more detail in FIG. 2.

In the illustrated example, the fan 20 includes a machine 32 and a power supply module 35.

The machine 32 is a rotating electric machine positioned in the middle segment 18.

More specifically, the machine 32 is a synchronous three-phase electric machine.

The machine 32 includes a shaft 33, a ventilation wheel 34, a rotor 40 and a stator 42.

The shaft 33 is a rotary shaft.

The ventilation wheel 34 is secured to the shaft 33.

The wheel 34 is for example a propeller.

According to the example of FIG. 2, the wheel 34 includes an axisymmetrical hub 36. The hub 36 bears a set of blades, the free end of which follows the profile of the inner surface of the middle segment 18.

The rotor 40 is of a general cylindrical shape.

The rotor 40 is rotatably mounted relatively to the stator 42 and is secured to the shaft 33.

The rotor 40 has an external surface with a cylindrical shape having a set of magnetic elements 43. Bars of magnetized materials are examples of magnetic elements 43.

The stator 42 extends around the rotor 40.

The stator 42 has a case 44 and an active portion 50.

The case 44 is cylindrical and forms an outer wall and an inner wall of the machine 32.

The case 44 harbors an active portion 50 of the stator 42 which is attached on the inner wall of the machine 32.

Figure 3:
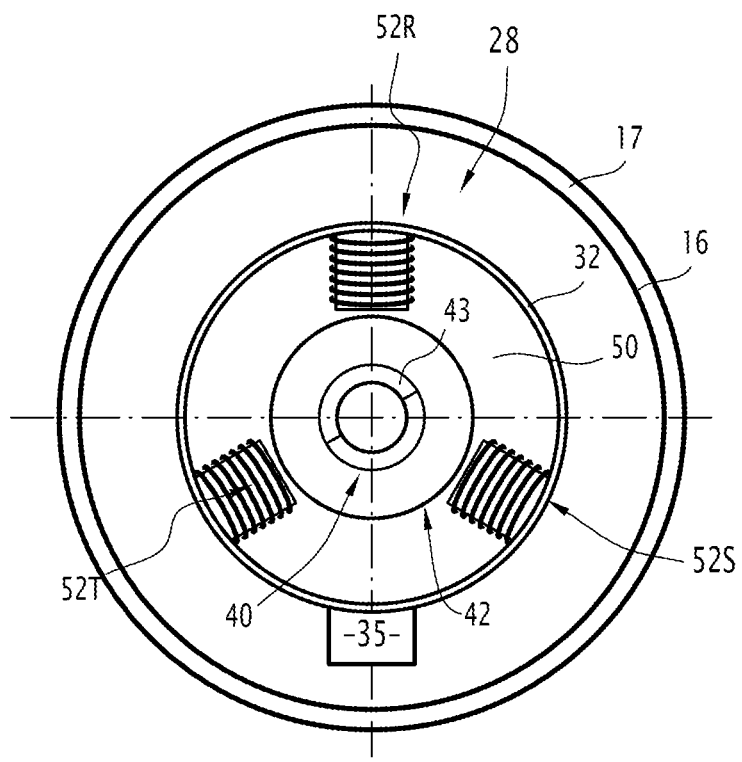
FIG. 3, is a cross-section of the fan of FIG. 2 along the line III-III'.

As visible in FIG. 3, the active portion 50 of the stator 42 forms a cylindrical ring.

The active portion 50 includes three sets 52R, 52S and 52T of windings on the internal surface of the active portion 50.

Each set of windings 52R, 52S and 52T is powered by one phase that circulates a current with a trapezoidal or sinusoidal shape.

Figure 4:
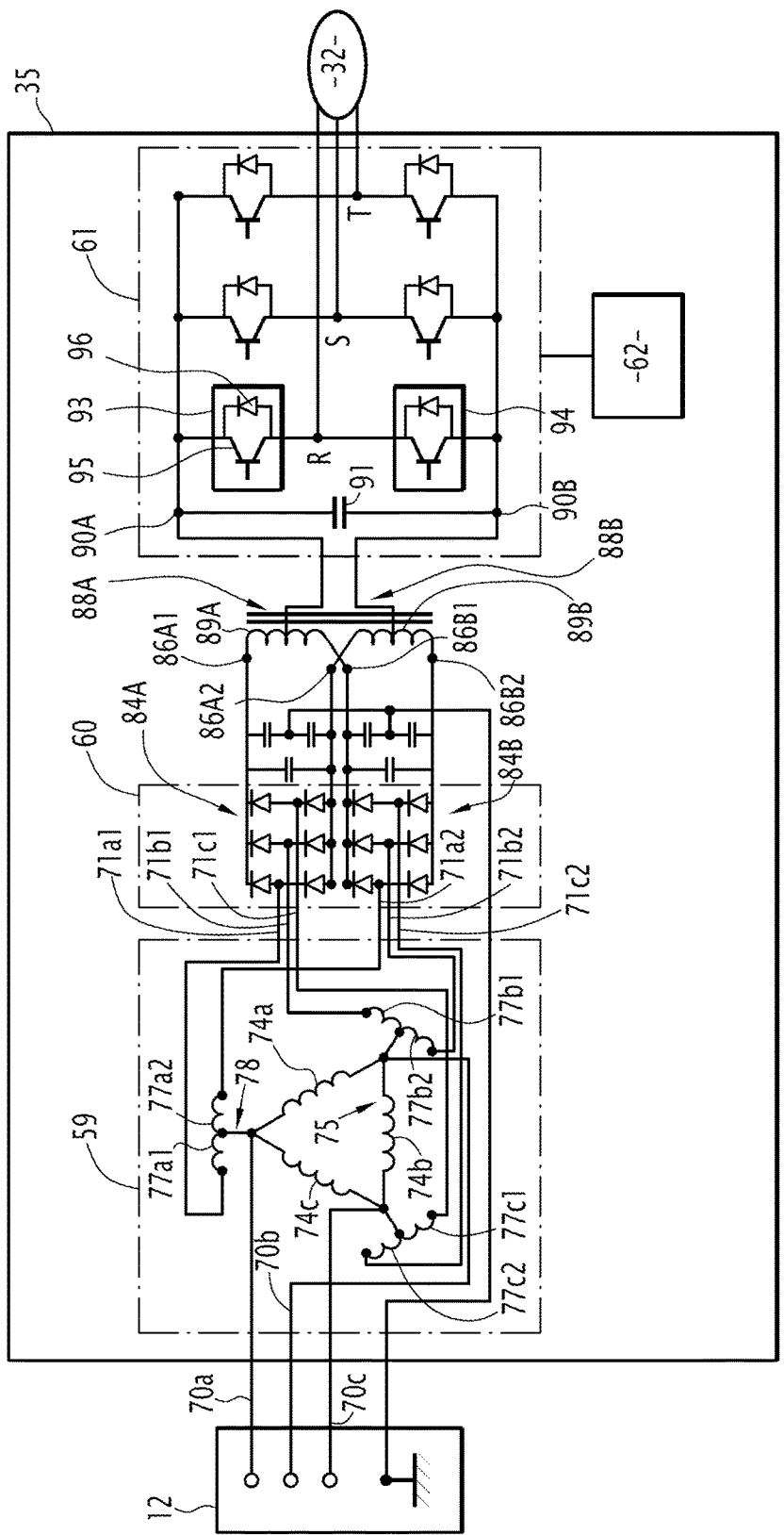
FIG. 4, is an electric diagram of the power supply module of FIG. 2, the power supply module including a transformation device.

As illustrated in FIG. 4, the power supply module 35 comprises a transformation device 59, a rectifier 60, a converter 61 and a driving unit 62.

The transformation device 59 is able to modify an electric value of the three-phase alternating current provided by the network 12.

For example, the transformation device 59 is able to modify a voltage value and/or an intensity value and/or a phase value of one of the three-phase alternating currents.

The transformation device 59 is further capable of converting the three-phase alternating current provided by the power supply network 12 into two three-phase alternating networks phase shifted by 30°. In other words, the transformation device 59 gives the possibility of converting the three-phase alternating current of the network 12 into six output single-phase alternating currents, each output single-phase alternating current corresponding to an output phase of the transformation device 59.

Figure 5:
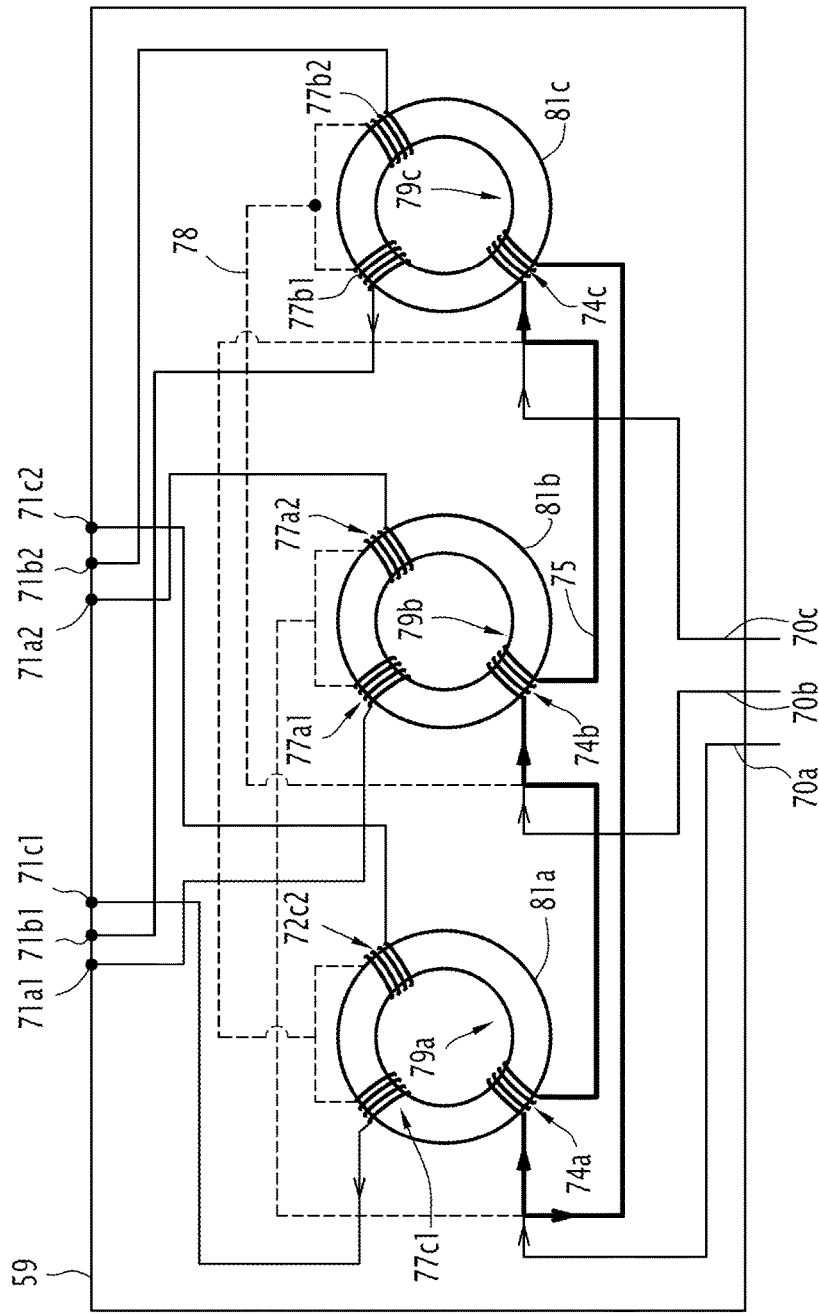
FIG. 5, is a schematic view of the transformation device of FIG. 4, FIG. 6, is a partly perspective view of the cooling assembly of FIG. 1.

For this, as illustrated in FIG. 5, the transformation device 59 comprises three input terminals 70a, 70b, 70c, six output terminals 71a1, 71a2, 71b1, 71b2, 71c1 and 71c2, three primary windings 74a, 74b and 74c, a first connecting unit 75, six secondary windings 77c1, 77c2, 77a1, 77a2, 77b1 and 77b2, a second connecting unit 78 and three self-transformers 79a, 79b and 79c.

As visible in FIG. 5, the first connecting unit 75 is illustrated by a strong continuous line, the second connecting unit 78 by a thin dashed line and the connecting units by a thin continuous line.

Each of the three input terminals 70a, 70b, 70c is connected to a terminal of the network 12.

Each output terminal, i.e. the first output terminal 71a1, the second output terminal 71b1, the third output terminal 71c1, the fourth output terminal 71a2, the fifth output terminal 71b2 and the sixth output terminal 71c2 are connected to the rectifier 60.

The output single-phase alternating currents provided by the first, second and third output terminals 71a1, 71b1, and 71c1 and the output single-phase currents provided by the fourth, fifth and sixth output terminals 71a2, 71b2 and 71c2 are for example phase shifted by 30°.

The three primary windings 74a, 74b and 74c are connected together as a triangle by the first connecting unit 75.

For each primary winding 74a, 74b and 74c, there exist two associated secondary windings.

The third secondary windings 77c1 and 77c2 are magnetically coupled only with the first primary winding 74a. On the one hand, the third secondary windings 77c1 and 77c2 are connected to the two other primary windings 74b and 74c by means of the second connecting unit 78. On the other hand, the third secondary windings 77c1 and 77c2 are connected to the third and sixth output terminals 71c1 and 71c2.

The first secondary windings 77a1 and 77a2 are magnetically coupled only with the second primary winding 74b. On the one hand, the first secondary windings 77a1 and 77a2 are connected to the two other primary windings 74a and 74c by means of the second connecting unit 78. On the other hand, the first secondary windings 77a1 and 77a2 are connected to the first and fourth output terminals 71c1 and 71c2.

The second secondary windings 77b1 and 77b2 are magnetically coupled only with the third primary winding 74c. On the one hand, the second secondary windings 77b1 and 77b2 are connected to the two other primary windings 74a and 74b by means of the second connecting unit 78. On the other hand, the second secondary windings 77b1 and 77b2 are connected to the second and fifth output terminals 71b1 and 71b2.

The three self-transformers 79a, 79b and 79c are three distinct single-phase self-transformers visible in FIG. 2 and FIG. 5.

The three self-transformers 79a and 79b and 79c are for example identical and are magnetically decoupled by a magnetic circuit without any physical air gap.

Each self-transformer 79a, 79b, 79c is connected to an input terminal 70a, 70b and 70c, and to two output terminals 71a1, 71a2, 71b1, 71b2, 71c1 and 71c2.

Each self-transformer 79a, 79b, and 79c is able to modify the values and/or the voltage and/or intensity phase of the single-phase alternating current from the input terminal 70a, 70b and 70c to which the self-transformer 79a, 79b, 79c is connected.

In the case illustrated in FIG. 5, each self-transformer 79 comprises a ferromagnetic core 81 with a torus shape. The first self-transformer 79a includes a first core 81a, the second self-transformer 79b includes a second core 81b and the third self-transformer 79c includes a third core 81c.

According to the example of FIG. 2, each core 81a, 81b and 81c is of a torus shape.

The first primary winding 74a and the third secondary windings 77c1 and 77c2 are wound on the core 81a of the first self-transformer 79a.

The second primary winding 74b and the first secondary windings 77a1 and 77a2 are wound on the core 81b of the second self-transformer 79b.

The third primary winding 74c and the second secondary windings 77b1 and 77b2 are wound on the core 81c of the third self-transformer 79c.

Figure 6:
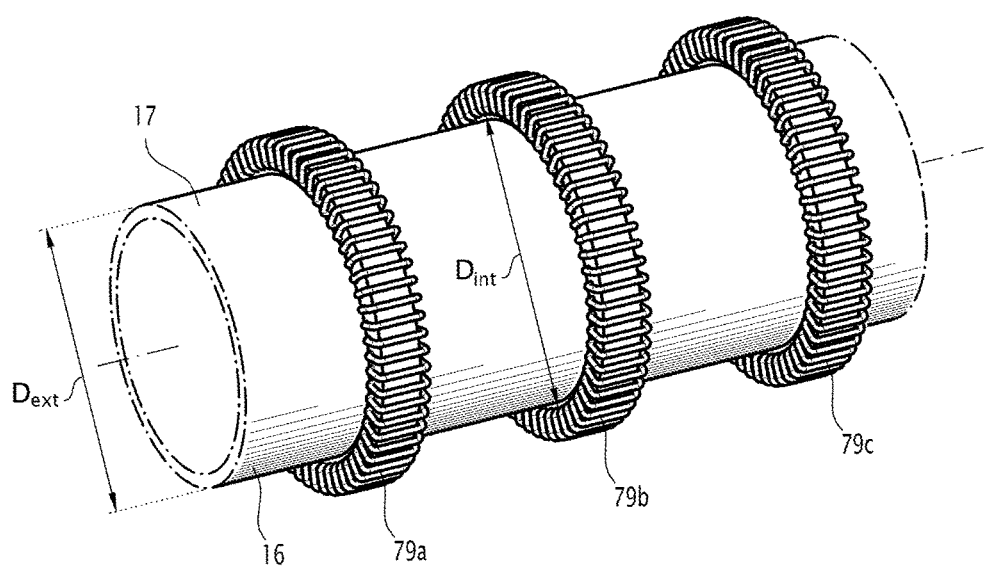

As visible in FIGS. 2 and 6, each self-transformer 79a, 79b and 79c surrounds the side wall 17 of the conduit 16.

Preferably, each self-transformer 79a, 79b and 79c entirely surrounds the side wall 17 of the conduit 16, i.e. over 360°.

Further, each single-phase self-transformer 79a, 79b, 79c has an inner diameter $D_{int}$ and the side wall 17 has an outer diameter $D_{ext}$.

The inner diameter $D_{int}$ of each single-phase self-transformer 79a, 79b, 79c is greater than or equal to the outer diameter $D_{ext}$ of the side wall 17.

According to the illustrated example, the inner diameter $D_{int}$ of each single-phase self-transformer (79a, 79b, 79c) is greater than or equal to 70 millimeters.

Further, it is visible in FIG. 2 that the inner diameter $D_{int}$ of each single-phase self-transformer 79a, 79b, 79c is identical.

Each single-phase self-transformer 79a, 79b, 79c includes an inner surface, the inner surface being in contact with the side wall 17 of the conduit portion 16. This gives the possibility of ensuring a good thermal contact between the side wall 17 and each single-phase self-transformer 79a, 79b, 79c.

In order to increase such an effect, the totality of the inner surface of each single-phase self-transformer 79a, 79b, 79c is in contact with the side wall 17.

In such a case, each of the self-transformers 79a, 79b, and 79c is of a mating shape to the side wall 17.

Further, each single-phase self-transformer 79a, 79b, 79c is at the same distance of the closest single-phase self-transformer 79a, 79b, 79c. This means that two equal distances may be defined. The first distance corresponds to the distance between the first single-phase self-transformer 79a and the second single-phase self-transformer 79b, the second distance corresponds to the distance between the second single-phase self-transformer 79b and the third single-phase self-transformer 79c.

According to FIG. 4, the rectifier 60 includes two rectifying bridges 84A and 84B. Both rectifying bridges 84A and 84B are connected in parallel to the transformation device 59.

More particularly, the first rectifying bridge 84A is connected to the three output phases corresponding to the first, second and third output terminals 71a1, 71b1 and 71c1 of the transformation device 59 and the second rectifying bridge 84B is connected to the three output phases corresponding to the fourth, fifth and sixth output terminals 71a2, 71b2 and 71c2 of the transformation device 59. Each rectifying bridge 84A and 84B includes a pair of diodes for each output phase allowing rectification of the relevant phase.

Each rectifying bridge 84A and 84B further includes two outputs, i.e. two first outputs 86A1 and 86A2 for the first rectifying bridge 84A and two second outputs 86B1 and 86B2 for the second rectifying bridge 84B each issuing a rectified current.

The outputs 86A1, 86A2, 86B1 and 86B2 of each of the rectifying bridges 84A and 84B are combined by two inductors of interfaces 88A and 88B each including one coil. More specifically, the first interface inductor 88A includes a first coil 89A while the second interface inductor 88A includes a second coil 89B.

The first coil 89A is connected to the outputs 86A1 and 86B1 while the second coil 89B is connected to the outputs 86A2 and 86B2.

The interface inductors 88A and 88B are adapted so as to average the currents issued by each output pair 86A1, 86A2, 86B1 and 86B2 of the two rectifying bridges 84A and 84B for providing a direct current to the converter 61.

The converter 61 includes three switching branches corresponding to the three phases R, S, T of the rotating machine 32. The three branches are mounted in parallel between input terminals 90A and 90B of the converter 61.

The converter 61 further includes a capacitor 91 mounted in parallel on the three switching branches. Each branch includes two switches 93 and 94 mounted in series and between which is formed a three-phase power supply point R, S, T of the rotating electric machine 32.

Each switch includes a transistor 95 and a diode 96 mounted in parallel.

Each transistor 95 includes a gate connected to the driving unit 62 via a control circuit. This allows switching of the transistor 95 between an open position and a close position.

In the close position, the transistor 95 of each switch 93 and 94 is able to let through a current respectively from the terminal 90A to one of the terminals of the R, S and T phases or of one of the terminals of the R, S and T phases towards the terminal 90B.

In the open position, the transistor 95 does not let through any current.

Each transistor 95 is for example an insulated gate bipolar transistor (also called IGBT).

The diode 96 of each switch 93, 94 is able to let through a current respectively from the terminal 90B to one of the terminals of the R, S, T phases or from one of the terminals of the R, S, T phases towards the terminal 90A. When the transistors 95 are all open, the diodes form a rectifying bridge.

The converter 61 is for example a pulsed width control converter.

A driving unit 62 is connected to the converter 61 via the control circuit and gives the possibility of controlling the operation of the converter 61.

The operation of the fan 20 is now described.

Initially, the fan 20 is disconnected from the network 12. When the piece of equipment 14 should be cooled, the fan 20 is connected to the network 12.

A three-phase electric current from the network 12 is first transformed by the transformation device 59. Notably, each of the three self-transformers 79a, 79b and 79c convert the single-phase alternating current provided by the corresponding phase into two voltage single-phase alternating currents with phases different from the initial phases.

Next, the currents modified by the transformation device are converted into a direct current by the rectifier 60.

Next, the converter 61 receives the direct current and converts the direct current into a three-phase alternating current adapted for powering the rotating electric machine 32, and in particular the stator 42.

The stator 42 generates a magnetic field causing rotation of the rotor 40 and accordingly the rotation of the ventilation wheel 34.

The manufacturing of the transformation device 39 with three distinct single-phase self-transformers 79a, 79b and 79c is simpler and less expensive than the manufacturing of a three-phase self-transformer conventionally used in the state of the art.

Indeed, the method for winding a single-phase self-transformer 79a, 79b and 79c may be carried out in an entirely automatic way. The requirements on the winding of a single-phase self-transformer 79a, 79b and 79c are less constraining than the requirements for a three-phase self-transformer. In particular, it is easier to control the manufacturing time, the manufacturing costs and the reproducibility of the performances.

Further, the lack of an air gap in a single-phase self-transformer 79a, 79b and 79c gives the possibility of better controlling the current including the windings 74a, 74b, 74c, 77a1, 77a2, 77b1, 77b2, 77c1 and 77c2 during the design and the operation of the transformation device 59.

Further, the form proposed for the transformation device 59 is optimized for integration into a tubular shape. Thus, the proposal is to put the transformation devices 59 around the conduit 16, which gives the possibility of obtaining a cooling assembly 15 which is more compact and better adapted to heat dissipation. Further, some room is cleared for inserting additional electronics into the cooling assembly 15.

Further, the fact that the inner diameter $D_{int}$ of each single-phase self-transformer 79a, 79b and 79c is relatively large gives the possibility of suppressing winding constraints.

The invention claimed is:
1. A cooling assembly including:
  a conduit including a side wall, an air intake and an air outlet allowing circulation of an air flow in the conduit, and
  a fan comprising:
  a rotating electric machine comprising:
  a rotary shaft,
  a ventilation wheel secured to the shaft,
  a power supply module able to connect the rotating electric machine to an electric power supply network providing a three-phase electric network, the power supply module including a transformation device able to adapt the three-phase electric current provided by the three-phase electric network for powering the rotary electric machine and including:
  three input terminals, the three input terminals being connected to the three-phase electric network, at least three output terminals, the at least three output terminals being connected to the rotating electric machine, three distinct single-phase self-transformers which are magnetically decoupled from one another, each single-phase self-transformer being connected to one of the input terminals and at least to one of the output terminals and being able to modify the voltage values of an input single-phase alternating current on the corresponding input terminal for obtaining a modified output current on said or each output terminal corresponding to the single-phase self-transformer, each self-transformer surrounding the side wall of the conduit.

2. The cooling assembly according to claim 1, wherein each single-phase self-transformer has an inner diameter and the side wall of the conduit has an outer diameter, the inner diameter of each single-phase self-transformer being greater than or equal to the outer diameter of the side wall.

3. The cooling assembly according to claim 2, wherein the inner diameter of each single-phase self-transformer is identical.

4. The cooling assembly according to claim 1, wherein each single-phase self-transformer includes an inner surface, the inner surface being in contact with the side wall of the conduit.

5. The cooling assembly according to claim 4, wherein the totality of the inner surface of each single-phase self-transformer is in contact with the side wall of the conduit.

6. The cooling assembly according to claim 1, wherein each single-phase self-transformer includes:
 a ferromagnetic core of a torus shape and
 a primary winding wound around at least one portion of the core and connected to the input terminal of the single-phase self-transformer.

7. The cooling assembly according to claim 1, wherein each single-phase self-transformer is at the same distance from the closest single-phase self-transformer.

8. The cooling assembly according to claim 1, wherein the conduit further includes:
 a heat exchanger.

9. An aircraft including an assembly according to claim 1.

* * * * *